A. S. RICE.
COFFEE URN.
APPLICATION FILED JUNE 19, 1919.

1,343,848.

Patented June 15, 1920.

WITNESSES

INVENTOR
ANSON S. RICE
BY
ATTORNEYS

UNITED STATES PATENT OFFICE.

ANSON S. RICE, OF BROOKLYN, NEW YORK, ASSIGNOR TO DUPARQUET, HOUT & MONEUSE, OF NEW YORK, N. Y.

COFFEE-URN.

1,343,848.     Specification of Letters Patent.     Patented June 15, 1920.

Application filed June 19, 1919. Serial No. 305,274.

*To all whom it may concern:*

Be it known that I, ANSON S. RICE, a citizen of the United States, and a resident of the city of New York, borough of Brooklyn, in the county of Kings and State of New York, have invented a new and Improved Coffee-Urn, of which the following is a full, clear, and exact description.

The present invention relates to new and useful improvements in coffee urns, and pertains more particularly to that type of coffee urns employed for making coffee in quantities such as required for hotel and restaurant use.

The primary object of the invention is to provide a coffee urn in which the heat is derived from an electrical source.

A further object of the invention is to construct a coffee urn in such a manner that a plurality of individual electric heating units are employed, and controlled in such a way that one or more of the heating units may be cut off or on as desired.

With the above and other objects in view which will appear as the nature of the invention is better understood, reference is had to the accompanying drawings in which—

Figure 1:
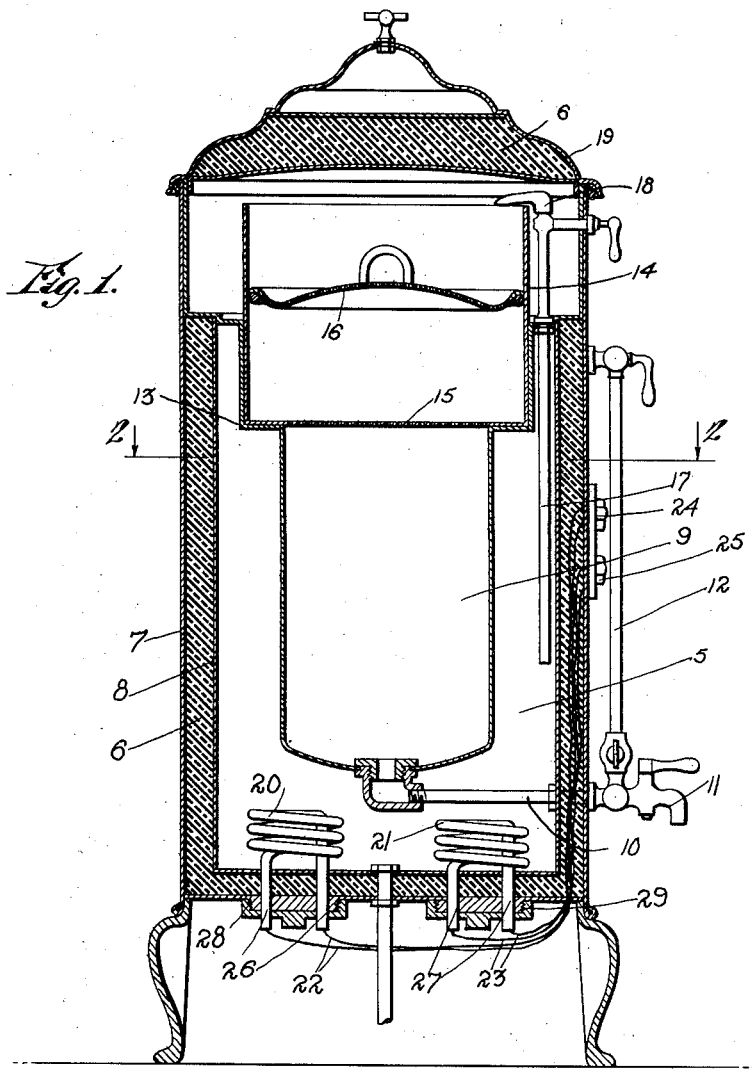
Figure 1 is a vertical sectional view of a coffee urn constructed in accordance with the present invention.

Referring more particularly to the drawings, the device comprises a water receptacle 5, which is heat insulated by means of the material designated by the reference numeral 6. This heat-insulating material may be of any desired form especially applicable for the purpose, and is contained between the two walls 7 and 8, the wall 8 being the wall of the water receptacle 5.

Mounted within the water receptacle 5, is a coffee receptacle 9, and leading from said coffee receptacle 9 is a discharge pipe 10, the flow through which is controlled by means of the faucet or spigot 11. The reference character 12 designates a suitable gage glass, by means of which the level of coffee in the coffee receptacle 9 may be ascertained. The upper end of the coffee receptacle 9 is flared outwardly as at 13, and mounted in said outwardly-flared portion 13, is a percolating receptacle 14, the bottom of which is provided with a plurality of perforations 15. Mounted within the percolating receptacle 14, and slidable vertically thereof is a perforated cover 16, and leading from the water receptacle 5, is a stand pipe 17, the upper end of which is provided with a right-angular nozzle 18, by means of which water from the receptacle 5 is discharged into the percolating receptacle 14 on top of the cover 16 therein.

The outer wall 7 of the water receptacle 5 is extended to a point above the top of the percolating receptacle 14, and the upper end of the coffee receptacle 9 terminates at a point flush with the top edge of said outer wall 7. The reference character 19 designates a cover which is adapted to fit within the open end of the urn to close the same, and said cover is provided with heat-insulating material 6 heretofore mentioned.

Mounted in the bottom of the water receptacle 5, are two electrical heating elements 20 and 21, and leading from each of said elements 20 and 21, are conductor wires 22 and 23. The conductor wires 22 lead to a switch 24 on the front of the urn, and the conductor wires 23 lead to a switch 25 mounted on the front of the urn adjacent the switch 24. Each of these electrical heating elements 21 and 22 comprises a plurality of coils or convolutions of suitable material well known in the art, and depending from each of the elements 20 and 21, are two legs 26 and 27, respectively. The legs 26 and 27 pass downwardly through the bottom of the urn proper and are adapted to be secured thereto by means of internally screw-threaded nuts 28, said nuts being received by the integral projections 29 on the bottom wall of the urn. By such a construction, it will be apparent that either of the heating elements 20 or 21 may be connected or disconnected at the will of the operator, and, furthermore, that said heating elements may be readily detached and renewed as occasion may require.

The operation of the device is as follows: Water to the desired amount is placed in the water receptacle 5, a sufficient quantity of coffee being placed in the percolating receptacle 14. Both heaters 20 and 21 are now switched on and the heat furnished thereby sets up a boiling of the water in the water receptacle 5. The boiling water passes upwardly through the pipe 17 and is discharged onto the cover 16 of the percolating receptacle 14, from whence it passes through the coffee into the coffee receptacle 9, from which it may be drawn off at will through the medium of the spigot or faucet 11.

When the coffee has been sufficiently percolated, one of the heating elements 20, 21, may be cut out, the other being left on for maintaining the prepared coffee at the desired temperature until it is entirely consumed.

Figure 2:
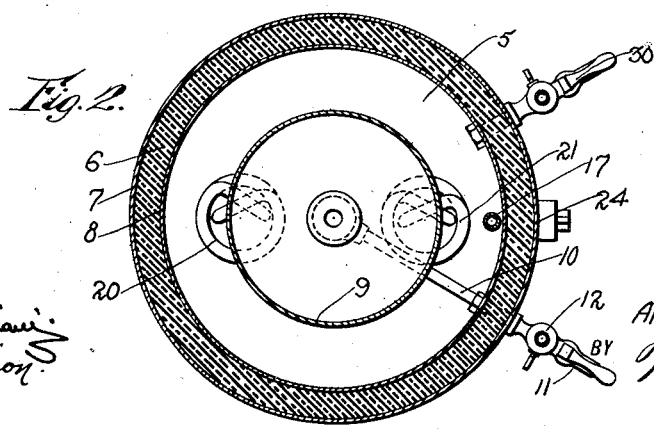
Fig. 2 is a transverse sectional view on the line 2—2 of Fig. 1.

For the purpose of drawing heated water from the water receptacle 5, a spigot or faucet 30 is provided thereon, said spigot or faucet communicating with the interior of said water receptacle as shown in Fig. 2.

Having thus described the invention, what is claimed as new is:

A coffee urn comprising in combination with the main body and water receptacle of the urn, a plurality of electric heaters of the submerged type removably secured to the bottom wall of the water receptacle, means for supplying current to each of said heaters independently, and means for independently controlling the supply of current to said heaters.

ANSON S. RICE.